(12) United States Patent
Steinert

(10) Patent No.: US 8,294,728 B2
(45) Date of Patent: Oct. 23, 2012

(54) PROCESS FOR GENERATING DISPLAY IMAGES FROM ACQUIRED RECORDED IMAGES, AND MEANS FOR CARRYING OUT THE PROCESS

(75) Inventor: Jörg Steinert, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 919 days.

(21) Appl. No.: 11/991,999

(22) PCT Filed: Sep. 14, 2006

(86) PCT No.: PCT/EP2006/008947
§ 371 (c)(1),
(2), (4) Date: Mar. 12, 2008

(87) PCT Pub. No.: WO2007/039054
PCT Pub. Date: Apr. 12, 2007

(65) Prior Publication Data
US 2010/0134511 A1    Jun. 3, 2010

(30) Foreign Application Priority Data
Oct. 1, 2005   (DE) .......................... 10 2005 047 261

(51) Int. Cl.
*G09G 5/02* (2006.01)
(52) U.S. Cl. ........... 345/589; 345/629; 348/79; 348/584
(58) Field of Classification Search .................. None
See application file for complete search history.

(56) References Cited

U.S. PATENT DOCUMENTS

| | | | |
|---|---|---|---|
| 4,636,850 A | 1/1987 | Stewart | |
| 4,661,986 A | 4/1987 | Adelson | |
| 4,673,988 A * | 6/1987 | Jansson et al. | 358/453 |
| 4,889,423 A | 12/1989 | Trumbull | |

FOREIGN PATENT DOCUMENTS

| | | |
|---|---|---|
| DE | 197 02 753 | 7/1998 |
| DE | 102 57 237 | 6/2003 |
| DE | 102 35 657 | 2/2004 |
| WO | 96/18265 | 6/1996 |
| WO | 02/21828 | 3/2002 |
| WO | 02/059692 | 8/2002 |

OTHER PUBLICATIONS

Measurement Science and Technology, vol. 9 (1998) pp. 1142-1151 Jordan, et al. Highly accurate non-contact characterization of engineering surfaces using confocal microscopy.

* cited by examiner

*Primary Examiner* — Antonio A Caschera
(74) *Attorney, Agent, or Firm* — Frommer Lawrence & Haug LLP

(57) ABSTRACT

An image processing device comprising an acquisition interface for acquiring recorded image data or recorded image signals and a graphics interface for a display device is constructed in such a way that a temporal sequence of recorded images can be acquired via the acquisition interface and an image data acquisition device connected to the latter and a temporal sequence of display images can be generated from the recorded image sequence, preferably with a smaller quantity of display images over the period of time in which the recorded image sequence is acquired. A display image of the display image sequence is generated from a partial sequence of at least two already acquired recorded images of the recorded image sequence, this partial sequence being associated with the display image of the display image sequence, and the display images can be sent to the display device via the graphics interface.

22 Claims, 2 Drawing Sheets

PROCESS FOR GENERATING DISPLAY IMAGES FROM ACQUIRED RECORDED IMAGES, AND MEANS FOR CARRYING OUT THE PROCESS

CROSS-REFERENCE TO RELATED APPLICATIONS

This is a national phase application of International Application No. PCT/EP2006/008947, filed Sep. 14, 2006 which claims priority of German Application No. 10 2005 047 261.3, filed Oct. 1, 2005, the complete disclosures of which are hereby incorporated by reference.

BACKGROUND OF THE INVENTION a) Field of the Invention

The present invention is directed to a process for generating display images from acquired recorded images and to means for carrying out the process.

b) Description of the Related Art

In many optical and optoelectronic devices which acquire images of an object by means of at least one detector and display them on a display device such as a monitor, images of an object can be acquired at a recording speed that is appreciably higher than the frame frequency of the display device and/or of the recorded image rate that can be resolved by the human eye with respect to time.

Therefore, the information contained in the recorded images cannot be displayed in real time in known optical devices, particularly microscopes, in such a way that it can be detected by a person. In particular, information about rapidly occurring processes on or in the object cannot be tracked in real time. Known devices only permit subsequent tracking of state changes after the entire sequence of recorded images has been acquired.

OBJECT AND SUMMARY OF THE INVENTION

Therefore, it is the primary object of the present invention, on the one hand, to provide a process for rendering information from acquired recorded images that allows state changes in an object to be displayed and tracked and, on the other hand, to provide means for carrying out the process. It should preferably be possible for the human eye to track state changes of this kind which take place more rapidly that can be detected by the human eye or than can be displayed on a display device such as a monitor.

This object is met by a process for generating display images in which a temporal sequence of recorded images is acquired and a temporal sequence of display images is generated from the sequence of recorded images, wherein a display image of the sequence of display images is generated in each instance from a partial sequence of at least two already acquired recorded images of the sequence of recorded images, this partial sequence being associated with this display image.

Further, the above-stated object is met by an image processing device which comprises an acquisition interface for acquiring recorded image data or recorded image signals and a graphics interface for a display device and which is constructed in such a way that a temporal sequence of recorded images can be acquired via the acquisition interface and an image data acquisition device connected to the latter and a temporal sequence of display images can be generated from the recorded image sequence, wherein a display image of the display image sequence is generated from a partial sequence of at least two already acquired recorded images of the recorded image sequence, this partial sequence being associated with the display image, and the display images can be sent to the display device via the graphics interface.

In particular, the image processing device can comprise a data processing device with an acquisition interface for acquiring recorded image data or recorded image signals, a graphics interface for a display device, a storage in which data and instructions of a computer program are stored, and at least one processor which is connected to the interfaces and to the storage and, when the instructions are carried out via the acquisition interface and an image acquisition device connected with the latter, the processor acquires a temporal sequence of recorded images and generates a temporal sequence of display images from the recorded image sequence, wherein it generates a display image of the display image sequence from a partial sequence of at least two already acquired recorded images of the recorded image sequence, this partial sequence being associated with this display image, and sends the display images to the display device via the graphics interface.

Further, the above-stated object is met by a computer program for a data processing device comprising an acquisition interface for acquiring recorded image data or recorded image signals, a graphics interface for a display device, a storage in which data and the computer program are stored, and at least one processor which is connected to the interfaces and to the storage and which comprises instructions and, when the instructions are carried out, the processor implements the process according to the invention, in particular acquires a temporal sequence of recorded images via the acquisition interface and an image acquisition device connected to the latter, and generates a temporal sequence of display images from the recorded image data sequence, wherein it generates a display image of the display image sequence from a partial sequence of at least two already acquired recorded images of the recorded image sequence, this partial sequence being associated with this display image, and sends the generated display images to the display device via the graphics interface.

Further, the above-stated object is met by a storage medium on which the computer program mentioned above is stored. In particular, magnetic, magneto-optical and/or optical data media, e.g., diskettes, hard disks, compact disks or digital versatile disks, or non-volatile memories such as EEPROMs, or flash storage devices, or combinations thereof can be used as a storage medium.

In the process, a temporal sequence of recorded images of an object to be observed is acquired. By recorded image and display image is meant an amount of data which renders an optically generated or optically detectable, preferably two-dimensional, image. However, the process can also be used for three-dimensional images, for example, in the form of an amount of two-dimensional images of successive layers of the object or sample which extend substantially parallel. Therefore, it is particularly suitable for laser scanning microscopy.

The recorded images can be acquired substantially at a point in time as a totality or—when displayed in pixel form—by pixel or pixel group. When acquired by pixel or pixel group, image segments comprising one or more pixels are acquired and then combined to form recorded images.

The recorded images are acquired in temporal sequence, i.e., one after the other, and the time interval between successive recorded images can be optional in principle, but is preferably substantially constant. This has the advantage that it facilitates processing in real time. In particular, the interval between immediately succeeding images may be so small that these images can no longer be separated by the human eye or can no longer be displayed in real time on a display device such as a monitor.

For the purpose of acquiring recorded images, the image processing device has the acquisition interface for acquiring the recorded image data or recorded image signals. The construction of the acquisition interface depends upon the type of image recording device that is provided for use with the image processing device: if this image recording device only emits signals, the interface is constructed for receiving or entering signals and the image processing device is designed to convert the signals into data. If the image recording device outputs data directly, the interface need only be designed to read in or receive these data. The interface need not necessarily be designed for acquiring recorded image data which already describe a complete two-dimensional image. Rather, it is also possible for the image processing device to be constructed in such a way that it receives and reads in recorded image data of image segments, e.g., individual pixels or pixel groups, via the acquisition interface and then combines the image segments to form data for a recorded image which comprises the image segments. In particular, the image processing device can be designed to control and/or acquire a position of a device by means of which portions of an object to be imaged are imaged successively, i.e., in a scanning manner, on the image recording device in such a way that a two-dimensional recorded image of the object can be acquired in its totality. The control and/or acquisition is carried out in such a way that the recorded image can be rendered in its entirety from the image segment data or image segment signals.

In principle, the amount of time lapsing between the acquisition of the recorded images and the determination and/or display of the display images is optional. In particular, the determination and/or display need not be carried out until all of the recorded images of the object have been acquired. However, the process is preferably carried out in real time while an object is being observed so that the image processing device preferably has an operating speed that is sufficient for processing the recorded image sequence in real time. By processing in real time is meant in particular that a display image associated with a partial sequence of recorded images is determined, and particularly preferably also displayed, already during the acquisition of a partial sequence of recorded images which follows, preferably immediately, this first partial sequence. In this way, processes in living cells can be displayed immediately by the display images, for example, when used in microscopy.

A display image which is associated in time with a partial sequence having at least two recorded images of the sequence of recorded images is generated from this partial sequence. At least some of the display images are preferably generated, and particularly preferably displayed, already during the acquisition of the sequence of recorded images. In particular, all of the recorded images of the partial sequence can be processed for this purpose. The respective display image is preferably generated as soon as permitted by the processing speed after the last recorded image of the partial sequence with respect to time, i.e., after the recorded image of the partial sequence coming next in time. The display images are preferably generated in each instance depending on the at least two recorded images of the associated display images such that recorded image data of the two recorded images are evaluated for determining the display images.

In principle, the partial sequences of the recorded images can also comprise any quantities of recorded images, even inconsistent quantities of recorded images. However, all of the partial sequences preferably contain the same given quantity of recorded images, particularly preferably in the same order. This has the advantage of simplifying the evaluation of the recorded images for generating the display images. This quantity can be selected in such a way, particularly depending on the acquisition rate of the recorded images and the desired or possible display frequency of the display images, that the sequence of display images can be detected by the human eye or can be displayed on a display device.

Accordingly, a sequence of display images which present an evaluation of the recorded images and allow state changes to be displayed or tracked is formed from the sequence of recorded images that were recorded over a given recording time.

The display images can then be displayed by the display device so that an observer can observe them on the display device. For this purpose, the image processing device has the graphics interface which can be a graphics card, for example.

In principle, the image processing device can comprise corresponding non-programmable electronic circuits for generating the display images. Circuits of this kind can be characterized by a very high operating speed.

However, the construction of the image processing device in which it comprises the data processing device mentioned above has the advantage that various methods for generating the display images can be implemented in a simple manner by corresponding programming and, if required, can also be updated by updating the computer program. Further, no special electronic circuits need be provided for generating the display images. The storage of the data processing device can comprise a plurality of components, for example, a volatile part (RAM) and a non-volatile part in the form of an EEPROM or a read device (CD or DVD drive, USB interface) for a storage medium with the computer program with a storage medium inserted in the read device or connected to the latter.

The sequence of display images can comprise, e.g., as many display images as the recorded image sequence. However, in the process the quantity of display images of the sequence of display images is preferably less than the quantity of recorded images (41) of the recorded image sequence. To this end, the image processing device is preferably further constructed in such a way that the quantity of display images of the sequence of display images is less than the quantity of recorded images of the recorded image sequence. The computer program or the computer program in the data processing device then preferably comprises instructions so that the quantity of display images of the display image sequence is less than the quantity of recorded images of the recorded image sequence when the instructions are carried out by the processor. The embodiment form in which the sequence of display images has a smaller quantity of display images has the advantage that a data reduction and evaluation of the recorded image sequence is carried out according to a given evaluation schema which depends upon characteristics of the recorded images of the respective partial sequence and also optionally upon their recording time or position in the partial sequence. In particular, when the display images are generated and rendered over a period of time which is as long as the recording time this can result in a display frequency that allows the images to be displayed on a normal monitor.

In principle, the display images can be formed of any partial sequences of recorded images. However, it is preferable in the process for generating the display images that at least one display image is determined from a partial sequence with those recorded images of the recorded image sequence which were acquired, preferably only, within a given time period, preferably 1 s, prior to the determination of the display image. Further, to this end the image processing device is preferably constructed in such a way that for generating display images at least one display image is determined from a partial sequence with those recorded images of the recorded image sequence which were acquired, preferably only, within a given time period, preferably 1 s, prior to the determination of the display image. The computer program or the computer program in the data processing device then preferably comprises instructions so that the processor when executing instructions for generating the display images determines at least one display image from a partial sequence with those recorded images of the recorded image sequence that were acquired, preferably only, within a given time period, preferably 1 s, prior to the determination of the display image. This embodiment form has the advantage that the display images can be generated at least approximately in real time. Therefore, this embodiment form is also suitable particularly for the observation of samples during an examination.

In principle, the partial sequences of recorded images from which two successive display images are generated can overlap in that they comprise, for example, an identical recorded image. However, in the process for generating the display images at least one display image is determined from a partial sequence with those recorded images of the recorded image sequence that were acquired during or after the determination of the display image immediately preceding the display image. Further, to this end, the image processing device is preferably constructed in such a way that for generating the display images at least one display image is determined from a partial sequence with those recorded images of the recorded image sequence which were acquired during or after the determination of the display image immediately preceding the display image. The computer program or the computer program in the data processing device then preferably comprises instructions so that the processor when executing the instructions for generating the display images determines at least one display image from a partial sequence with those recorded images of the recorded image sequence that were acquired during or after the determination of the display image immediately preceding the display image. This embodiment form has the advantage that a display image directly following a given display image contains only evaluations of information about the time period between the display image and the immediately preceding display image, and the sequence of display images therefore contains as much information as possible about the development of the object over time. In particular, at a given acquisition rate for recorded images, a display image can be generated from a partial sequence with a given quantity K of recorded images, and the next display image is generated from a next partial sequence with the same quantity of K recorded images whose recorded images follow those of the preceding partial sequence. This means that the sequence of display images has a frame rate that is reduced by a factor K relative to the recorded image rate.

In principle, the recorded images and display images can be represented by data in any way. However, in the process it is preferable that the recorded images and the display images are formed by an arrangement of pixels and that for generating at least one display image the value of at least one pixel parameter of at least one pixel of the display image is determined from values of a pixel parameter of at least one recorded image pixel in the partial sequence of already acquired recorded images that is associated with the respective display image, which recorded image pixel is associated with the pixel of the respective display image. For this purpose, the recorded images and the display images are formed in the image processing device by an arrangement of pixels and, further, the image processing device is constructed in such a way that for determining at least one display image the value of at least one pixel parameter of at least one pixel of the display image is determined from values of a pixel parameter of at least one recorded image pixel in the partial sequence of already acquired recorded images that is associated with the display image, which recorded image pixel is associated with the pixel of the respective display image. In particular, in the data processing device and in the computer program, the recorded images and the display images can be formed by an arrangement of pixels, and the computer program comprises instructions during whose execution the processor, for determining at least one display image, determines the value of at least one pixel parameter of at least one pixel of the display image from values of a pixel parameter of at least one recorded image pixel in the partial sequence of already acquired recorded images that is associated with the display image, which recorded image pixel is associated with the pixel of the respective display image. The use of pixels for displaying the images makes it possible in an advantageous manner to use known acquisition interfaces and graphics interfaces. Further, local characteristics of the object can easily be evaluated by means of processing by pixel. By pixel parameter for a pixel is meant a parameter which is associated with the pixel or the pixel position and which renders a characteristic of the image element, possibly in connection with other pixel parameters for the pixel. The characteristic may be, for example, the brightness, intensity, gray value or a parameter of a color model in the recorded images and in the display images. The pixel parameters used for the recorded image pixels can differ from those of the display images.

In particular, in the process, the recorded image pixel parameter can be an intensity, a gray scale value or a brightness of the recorded image pixel, and two pixel parameters of a pixel of the display image can be a color and brightness of the pixel depending upon values of the recorded image pixel parameter of the associated pixel of the partial sequence of recorded images that is associated with the display image. For this purpose, the image processing device can be constructed in such a way that the recorded image pixel parameter renders an intensity, a gray scale window or a brightness of the recorded image pixel, and two pixel parameters of a pixel of the display image can render a color and brightness of the pixel depending upon values of the recorded image pixel parameter of the associated pixel of the partial sequence of recorded images which is associated with the display image. In particular, in the data processing device and in the computer program, recorded image pixel parameters render an intensity, a gray scale value or a brightness of the recorded image pixel, and two pixel parameters of a pixel of the display image can render a color and brightness of the pixel depending upon values of the recorded image pixel parameter of the associated pixel of the partial sequence of recorded images that is associated with the display image, the computer program containing corresponding instructions for this purpose. The advantage of this embodiment form consists in that not only the intensity or the gray value of the display image pixel but also, at the same time, the color can be used for the display to render the characteristics of the partial sequence of the recorded images which is associated with the respective display image. The color and the brightness need not be determined separately. Rather, depending upon the color model that is used, it is possible to change both parameters at the same time. By adjustment of the color is meant also the adjustment of a saturation of a color, for example, in the HSI color model.

In general, the pixel parameters for a pixel of the display image can be any function of at least the recorded image pixel parameter of the recorded image pixel of the partial image sequence associated with the display image, which recorded image pixel corresponds to the display image pixel. However, in the process in which the recorded image pixel parameter renders an intensity, a gray scale value or a brightness of the recorded image pixel, the value of the at least one pixel parameter of a pixel of the respective display image preferably renders the maximum, the minimum or an average of the recorded image pixel parameter of the associated pixel of the associated partial sequence of the recorded images. Further, to this end, the image processing device is preferably constructed in such a way that the recorded image pixel parameter renders an intensity, a gray scale value or a brightness of the recorded image pixel and that the value of the at least one pixel parameter of a pixel of the respective display image renders the maximum, the minimum or an average of the recorded image pixel parameter of the associated pixel of the associated partial sequence of the recorded images. In particular, the data processing device or the computer program can contain instructions so that, when the instructions are executed, the recorded image pixel parameter renders an intensity, a gray scale value or a brightness of the recorded image pixel, and that the value of a pixel of at least one pixel parameter of the respective display image renders the maximum, the minimum or an average of the recorded image pixel parameter of the associated pixel of the associated partial sequence of the recorded images. This embodiment form has the advantage that, in the first two cases, the user can perceive, even only very briefly, extrema of the intensity or gray value or brightness occurring, for example, in only one recorded image which he could not have seen in a real-time display or a display of, for example, only a given image of the partial sequence. In the case of an average, the user advantageously preserves a display image in which temporary fluctuations are compensated by averaging. In this connection, a weighted average can also be formed over the partial sequence as an average value, and this weighting can be selected as any value preferably greater than zero.

Further, in the process in which the recorded image pixel parameter renders an intensity, a gray scale value or a brightness of the recorded image pixel, the value of the at least one pixel parameter of the pixel of the respective display image renders the range of variation of the values of the recorded image pixel parameter of the pixel of the partial sequence of previously acquired recorded images which is associated with the display image, which pixel is associated with the display image pixel. To this end, the image processing device is preferably further constructed in such a way that the recorded image pixel parameter renders an intensity, a gray scale value or a brightness of the recorded image pixel, and the value of the at least one pixel parameter of the pixel of the respective display image renders the range of variation of the values of the recorded image pixel parameter of the pixel of the partial sequence of already acquired recorded images which is associated with the display image, which pixel is associated with the display image pixel. In particular, the data processing device or the computer program can contain instructions during and/or after whose execution the recorded image pixel parameter renders an intensity, a gray scale value or a brightness of the recorded image pixel, and the value of the at least one pixel parameter of the pixel of the respective display image renders the range of variation of the values of the recorded image pixel parameter of the pixel of the partial sequence of previously acquired recorded images which is associated with the display image, which pixel is associated with the display image pixel. This embodiment form has the advantage that a first evaluation of the values of the recorded image pixel parameter with respect to its variation over the respective partial sequence and therefore also preferably over the corresponding acquisition period can be carried out in this way in real time. In particular, the at least one display pixel parameter can describe a color or a gray scale value. In particular, at least two pixel parameters can be allocated to every display image pixel in such a way that, for example, the value of the minimum, maximum or average can be displayed as the brightness of the pixel and the value for the range of variation can be displayed as the color, e.g., in the HSI color model, as the hue of the pixel. The range of variation can be calculated, for example, as standard deviation or the amount of the difference of the minimum and maximum of the values of the recorded image pixel parameter of the associated partial sequence of recorded images.

The pixel parameter or pixel parameters of pixels of the display image need not depend solely upon at least some of the values of the pixel parameter of the corresponding recorded image pixels of the partial sequence of recorded images which is associated with the display image. Accordingly, in a preferred embodiment form of the method, the value of at least one pixel parameter of at least one pixel of the display image can be determined depending on the progress of the values of at least one pixel parameter of at least one pixel of the recorded images of the partial sequence which is associated with the display image. To this end, the image processing device is further preferably constructed in such a way that the value of at least one pixel parameter of at least one pixel of the display image is determined depending on the progress of the values of at least one pixel parameter of at least one pixel of the recorded images of the partial sequence which is associated with the display image. In particular, the computer program or the computer program in the data processing device can comprise instructions during whose execution the value of at least one pixel parameter of at least one pixel of the display image is determined depending on the progress of the values of at least one pixel parameter of at least one pixel of the recorded images of the partial sequence which is associated with the display image. This has the advantage that an evaluation of the acquired recorded images with respect to the dynamics or rate of change of regions in the recorded images can be carried out preferably in real time, and the results can be made visible in the display image at the same time. In particular, for example, the value of the at least one pixel parameter can be determined in such a way that the corresponding pixel is marked in color when the range of variation of the intensity of the corresponding pixel in the partial sequence of images which is associated with the respective display image exceeds a given threshold value.

In another preferred embodiment form, a color coding of the measuring time for recorded images within a partial sequence associated with a display image can be carried out in the display image. Accordingly, in the process, a color can be associated with at least one pixel of the recorded images of a partial sequence as a pixel parameter, which color corresponds to the position of the recorded image in the partial sequence or to the acquisition time, and a value of a pixel parameter of a display image pixel associated with the recorded image pixel, which pixel parameter reproduces a color, can be determined depending on the values of the pixel parameter. To this end, the image processing device can further be constructed in such a way that a color is associated with at least one pixel of the recorded images of a partial sequence as a pixel parameter, which color corresponds to the position of the recorded image in the partial sequence or to the acquisition time, and a value of a pixel parameter of a display image pixel associated with the recorded image pixel, which pixel parameter reproduces a color, is determined depending on the values of the pixel parameter. In particular, the computer program or the computer program in the data processing device can comprise instructions during whose execution the processor allocates a color to at least one pixel of the recorded images of a partial sequence as a pixel parameter, which color corresponds to the position of the recorded image in the partial sequence or to the acquisition time and, depending on the values of the pixel parameter, determines a value of a pixel parameter of a display image pixel associated with the recorded image pixel, which pixel parameter reproduces a color. This embodiment form has the advantage that the recorded images of a partial sequence can be evaluated, preferably in real time, in such a way that a user can obtain at least an impression of the development over time of the recorded images or of an observed sample in spite of the low frame frequency of the display images.

Another possibility for evaluation is afforded by an embodiment example of the invention in which pixels are after-illuminated. In the process, the maximum of the brightnesses of the pixels of the associated partial sequence of preceding recorded images, which pixels are associated with at least one pixel of the display image as pixel parameter, can be associated with the at least one pixel of the display image, then the brightness value is retained for a predetermined period of time and is then reduced by a predetermined dropping speed, wherein the brightness value of the pixel of the display image is reset when a brightness value of the associated pixel in a current recorded image is greater than the current brightness value of the pixel in the display image. To this end, the image processing device is preferably further constructed in such a way that the maximum of the brightnesses of the pixels of the associated partial sequence of preceding recorded images, which pixels are associated with at least one pixel of the display image as pixel parameter, can be associated with the at least one pixel of the display image, then the brightness value is retained for a predetermined period of time and is then reduced by a predetermined dropping speed, wherein the brightness value of the pixel of the display image is reset when a brightness value of the associated pixel in a current recorded image is greater than the current brightness value of the pixel in the display image. The computer program, in particular the computer program in the data processing device, can comprise instructions for this purpose and, when these instructions are executed, the maximum of the brightnesses of the pixels of the associated partial sequence of preceding recorded images, which pixels are associated with at least one pixel of the display image as pixel parameter, is associated by the processor with the at least one pixel of the display image, then the brightness value is retained for a predetermined period of time and is then reduced by a predetermined dropping speed, wherein the brightness value of the pixel of the display image is reset when a brightness value of the associated pixel in a current recorded image is greater than the current brightness value of the pixel in the display image. In particular, the predetermined time period can be greater than at least two time intervals between successive display images. This embodiment form has the advantage that high-intensity regions in the recorded image can be identified more easily.

In principle, the image processing device can be independent of an image data acquisition device or recording device for recording the recorded images. However, the subject matter of the invention also relates to an imaging device with an image data acquisition device, imaging optics for imaging an object on the image data acquisition device, and an image processing device, according to the invention, in which the acquisition interface is connected to the image data acquisition device. The advantage of integrating the image processing device in the imaging device consists in that it enables a fast data transfer to the image processing device. Further, a compact imaging device can be realized in which the image data acquisition device and recording device and the image processing device are arranged in a housing.

In principle, the imaging device can be constructed in any manner. However, the imaging device is preferably constructed as a microscope, particularly a laser scanning microscope. For this purpose, the imaging optics in particular are designed for the magnified imaging of an object to be observed.

An imaging device which is constructed as a laser scanning microscope in which the image data acquisition device simultaneously acquires an at least line-shaped region or a group of points of a sample makes it possible to acquire recorded images advantageously in a particularly fast manner.

The invention will be described more fully in the following by way of example with reference to the drawings.

DESCRIPTION OF THE PREFERRED EMBODIMENTS

Figure 1:
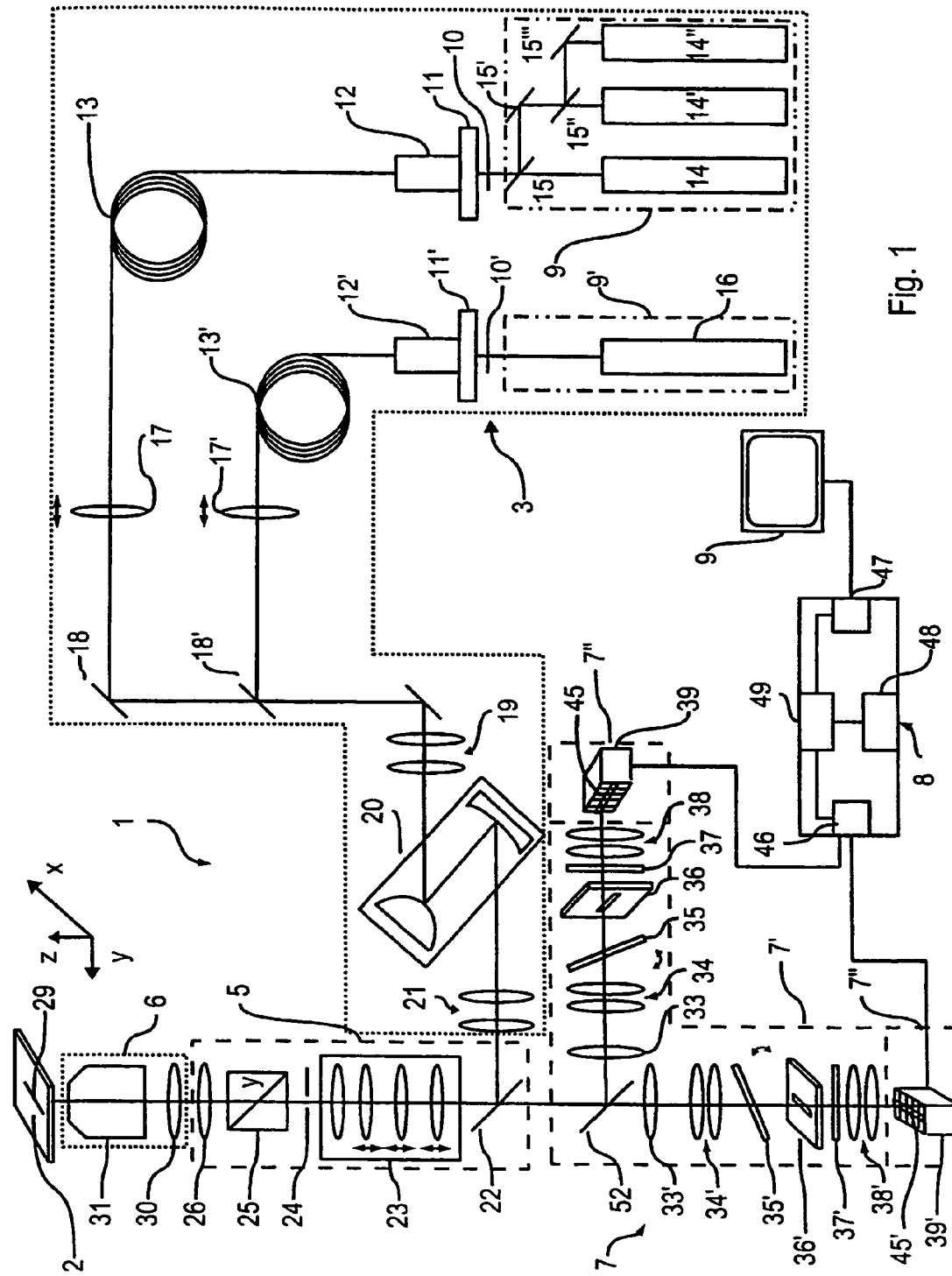
FIG. 1 is a schematic view of a laser scanning microscope.

In FIG. 1, an imaging device according to a first preferred embodiment form of the invention in the form of a laser scanning microscope 1 which is used for examining an object or a sample 2 has an illumination module 3 for emitting at least one collimated illumination beam 4 with a predetermined beam profile, a deflecting and scanning module 5 for controlled deflection of the illumination beam 4, microscope optics 6, and a detection module 7 with detection optics 7', and a recorded image data acquisition device 7" for acquiring at least partial images of the sample 2 that are imaged on the recorded image data acquisition device 7" by the imaging optics formed by the microscope optics 6 and the detection optics 7'. An image processing device 8 according to a first preferred embodiment form of the invention, which also serves as a controlling and evaluating device, is connected to the recorded image data acquisition device 7" and a display device 9 in the form of a color monitor.

The laser scanning microscope 1 is constructed with two channels for examining the sample in different selectable wavelength regions.

In this laser scanning microscope 1, the imaging of the sample 2 is carried out in that the sample 2 is scanned by the illumination beam 4 with a profile that is line-shaped at least near the sample 2.

The illumination module 3 serves to emit the collimated illumination beam 4 with a predetermined beam profile which can be focused on the sample in a line-shaped manner. The optical illumination radiation preferably has wavelengths that can trigger fluorescence in typical samples. The illumination module 3 is constructed for selectively emitting single-wavelength and multi-wavelength laser radiation. For this purpose, it has two laser units 9 and 9' succeeded, respectively, by a light valve 10 and 10' and an attenuator 11 and 11', the radiation of these two laser units 9 and 9' being coupled into light-conducting fibers 13 and 13' by coupling devices 12 and 12' after passing the respective light valve 10 or 10' and the respective attenuator 11 or 11'. The light valves 10 and 10' which are controlled by the image processing device 8 serving as control device are constructed as controllable beam deflectors by which a beam can be shut off without needing to shut off the respective laser units 9 and 9'. In the embodiment example, the light valves 10 and 10' are realized as AOTFs (acousto-optical tunable filters) which, depending upon the control, conduct the radiation of the respective laser unit to the succeeding attenuator or deflects the laser beam emitted by the respective laser unit to a light trap, not shown, for shutting off the beam.

In this embodiment example, the laser unit 9 has three lasers 14, 14' and 14'', all of which are operated simultaneously and emit laser beams of different wavelength regions. The laser beams are combined by beam-deflecting elements 15, 15', 15'' and 15''' to form an individual laser beam which then impinges on the light valve 10.

In contrast, laser unit 9' has only one laser 16 which emits a laser beam in a wavelength region that differs from the wavelength regions of the laser beams of lasers 14, 14' and 14''.

The radiation exiting from the light-conducting fibers 13 and 13', respectively, is collimated by collimating optics 17 and 17' in an infinite beam path and combined by deflection at beam-unifying mirrors 18 and 18' to form the illumination laser beam 4. The collimation is advantageously carried out in each instance by an individual lens which has a focusing function by means of displacement along the optical axis while controlled by the control unit in that the distance between the collimating optics 17', 17'' and the end of the respective light-conducting fibers 13 and 13' can be altered.

When the laser units 9 and 9' are operated simultaneously, a collimated illumination beam 4 having different wavelengths or wavelength regions depending on the control of the light valves can be generated.

The beam-unifying mirrors 18 and 18' are succeeded by a mirror which deflects the illumination laser beam to a beam-shaping unit 19, 20, 21 of the illumination module which lies downstream of the mirror in the illumination beam path. The beam-shaping unit 19 to 21 comprises a cylindrical telescope 19, aspheric optics 20, and cylindrical optics 21. These optical elements are selected in such a way that a beam which illuminates a substantially rectangular field in a beam profile plane is formed after reshaping, wherein the intensity distribution is suitable for generating a line-shaped focus. The intensity distribution along the longitudinal axis of the field is preferably not Gaussian, but rather box-shaped. The line is oriented perpendicular the drawing plane in FIG. 1, i.e., parallel to the x-direction of a Cartesian x-y coordinate system oriented orthogonal to the drawing plane.

The illumination beam 4 emitted by the illumination module 3 enters the deflecting module 5 which comprises along the illumination beam path a main color splitter 22 for deflecting the illumination beam 4, zoom optics 23, a diaphragm 24, a scanner 25 connected to the image processing device 8 for controlled deflection of the illumination beam in a y-direction orthogonal to the x-direction, and scan optics 26.

The main color splitter 22 serves on the one hand to guide the illumination beam 4 to the scanner 25 and on the other hand to pass detection radiation proceeding from the sample 2 with the lowest possible losses and to separate it from the illumination radiation. The term "color splitter" comprehends spectrally acting and non-spectrally acting splitters or splitter systems. The embodiment form used in this embodiment example is a spectrally-neutral splitter mirror according to DE 102 57 237 A1, whose disclosure, particularly in this respect, is hereby incorporated herein by reference.

The scanner 25 deflects the illumination beam in y-direction, i.e., in a direction orthogonal to the longitudinal direction of the rectangular beam profile or the x-direction, whereupon it is bundled by the scanning optics 26 and microscope optics 6 into a line-shaped focus 29 in a layer in the sample 2 extending parallel to the x-y plane. The layer can be selected by moving a sample stage, not shown in FIG. 1, in a z-direction orthogonal to the x-direction and y-direction, this sample stage being movable by a drive unit, also not shown, which is controlled by the image processing device serving as control device. The scanner 25 has at least one scan drive, which is controlled by the image processing device 8 for moving the illumination beam, and a mirror which is rotatable or swivelable around an axis of rotation parallel to the x-axis by means of the scan drive.

The microscope optics 6 comprise a tube lens 30 and an objective 31 in a known manner.

Detection radiation proceeding from the region of the focus 29, for example, fluorescence radiation excited by the illumination radiation, arrives back at the scanner 25 via the objective 31, the tube lens 30 of the microscope optics 6 and the scan optics 26 so that a steady detection beam is present in the reverse direction and in the direction of the detection radiation after the scanner 25. For this reason, also, it is said that the scanner 25 "descans" the detection radiation.

The main color splitter 22 can pass the detection radiation in wavelength regions other than those of the illumination radiation so that it can enter the detection module where it is detected.

In this embodiment example, the detection module is constructed with two channels. The detection optics 7' comprise an auxiliary color splitter 32 which is arranged in the detection beam path and which splits the detection radiation entering it into two partial detection beam bundles in different wavelength regions or two spectral channels and two arms which are formed identically with the exception of their spectral characteristics, both partial detection beam bundles formed by the auxiliary color splitter 32 being coupled into these arms. Therefore, the construction of only one of the arms is described while the other is constructed in a corresponding manner. The same reference numbers, supplemented by an apostrophe, are used for corresponding components to distinguish them from those in FIG. 1.

Arranged in each of the arms along a beam path are first spherical optics 33, a first cylindrical telescope 34, a plane-parallel plate 35 which is rotatable around two axis extending orthogonal to one another and to the beam path, a precision slit diaphragm 36, a blocking filter 37, a second cylindrical telescope 38 as parts of the detection optics and, finally, a CCD line detector 39 as part of the recorded image acquisition device 7.

The spherical optics 33 serve to image the focus area of the sample 2 on the CCD line detector 39.

The slit diaphragm 36 has a line-shaped diaphragm aperture which is arranged in such a way that, given a corresponding alignment, the line-shaped focus region in the sample 2 is imaged in the diaphragm aperture so that a confocal imaging is achieved in a direction orthogonal to the longitudinal direction of the beam profile of the detection radiation, this beam profile being elongated in a direction corresponding to the direction of the focus 29, but a normal imaging is achieved in the direction orthogonal to this direction. The two cylindrical telescopes 34 and 38 also serve for this purpose, their cylindrical lenses being arranged in a corresponding manner.

In a known manner, the width of the diaphragm aperture of the slit diaphragm 36 determines the depth of focus at which the detection radiation can be detected and, therefore, the thickness of the layer in the sample 2 from which detection radiation is detected.

The plane-parallel plate 35 serves to adjust the detection beam bundle to the aperture of the slit diaphragm 36 in two directions orthogonal to the beam path by tilting the plate 35. In particular, an adjustment of the position of the images of the focus region on the line detectors 39 and 39' can be carried out by means of this plate so that identical regions can be imaged on corresponding detector elements.

The optional blocking filter 37 which blocks out unwanted illumination radiation reaching the detector module 7 is arranged downstream of the slit diaphragm 36.

The radiation which originates from a determined depth portion and which is separated in this way and fanned out in a line-shaped manner is then acquired by the line detector 39 whose signals are acquired by the image data acquisition device 8.

The illumination module 3 together with the aspherical unit 20 can serve to uniformly fill a pupil between a tube lens and an objective. In this way, the optical resolution of the objective can be fully exploited.

The line detector 39, a CCD line detector in the present example, has a row of N (N being a whole number greater than 1) detector elements 45 for the detection radiation. The row is oriented parallel to the longitudinal direction of the slit-shaped aperture of the slit diaphragm 36. Since the focus 29 is imaged on the line detector 39 along its longitudinal direction, parallel intensities from portions of a region of the sample 2 which lie adjacent to one another along the longitudinal axis of the focus 29 are imaged in the focus 29 on corresponding detector elements 45 of the line detector 39 so that a spatially resolved imaging of the focus 29 or, more exactly, of the corresponding region of the sample 2 in the focus 29 is carried out in this x-direction. The line detector 39 emits image data acquisition signals corresponding to the intensities acquired in a spatially resolved manner by the detector elements 45.

The recorded image data acquisition device 7" and particularly the line detectors 39 and 39' therein are connected by a signal connection to the image processing device 8 which also acts as a controlling and evaluating device and which serves on the one hand to control the deflecting module 5 and on the other hand to evaluate the signals of the recorded image data acquisition device 7", more exactly the image data acquisition signals of the line detectors 39 and 39', while forming display images which are displayed on a display device 9, in the present example a color monitor, which is connected to the image processing device 8 by a signal connection.

The image processing device 8, which is constructed as a data processing device, has an acquisition interface 46 to the recorded image data acquisition device 7" or its line detectors 39 and 39', a graphics interface 47 connected to the display device 9, a storage 48 in which data and instructions of a computer program are stored, and a microprocessor 49 which is connected to the interfaces 46 and 47 and carries out the process described in the following by executing the instructions. A digital signal processor or a combination of processors can also be used in place of a microprocessor.

Further, the image processing device 8 is also provided with devices for controlling the scanner 26 and synchronizing the acquisition of images by the line detectors 39 and 39' with the position of the scanner 25, which can be realized in part by the microprocessor 49 and can also comprise other components, not shown in FIG. 1, that are familiar to the person skilled in the art.

Figure 2:
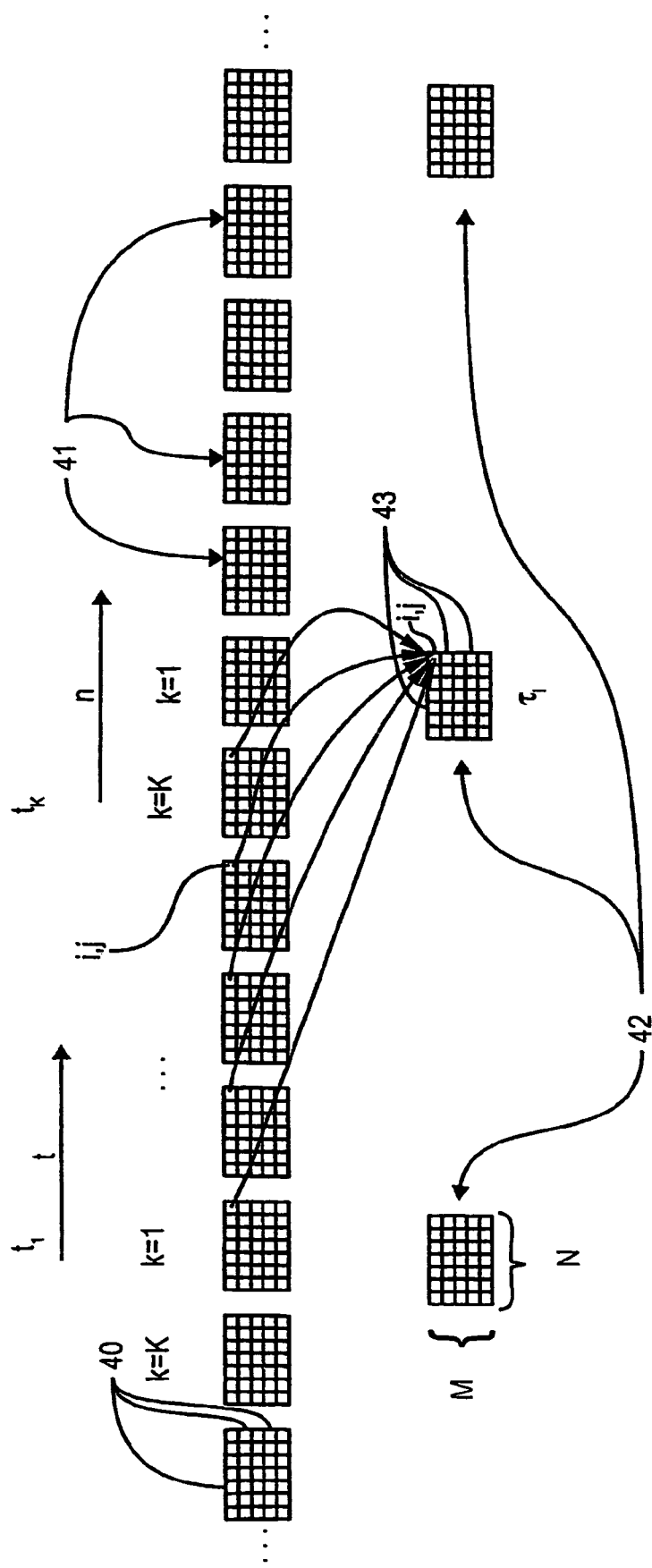
FIG. 2 is a schematic view of a section from a recorded image sequence acquired by the microscope according to FIG. 1 and corresponding display images.

Recorded images of a layer in the sample 2, whose layer thickness is given by the width of the slit opening of the diaphragms and the characteristics of the imaging optics 6, are rendered by a rectangular arrangement of image elements or pixels 40. The characteristics of the pixels arise from detector elements 45 and 45', respectively, of the line detectors 39 and 39', respectively, which correspond to the recorded image data from the same location on the sample insofar as both are evaluated, and otherwise only from the detector elements 45 or 45' of one of the line detectors 39 or 39'. Detector elements corresponding to the same location on the sample 2 will be referred to hereinafter as being associated with one another. Some recorded images 41 of a sequence of recorded images are shown in FIG. 2, wherein the quantity of pixels is reduced in relation to the actual quantity for the sake of clarity. A brightness, i.e., a value of a quantity representing the intensity or energy of the detection radiation, is associated with every pixel of a respective recorded image 41 as a pixel parameter that renders the characteristics of the recorded image in addition to the position of the pixel. The display images 42 are likewise rendered by a rectangular arrangement of image elements or pixels 43 which, in the embodiment example, correspond with respect to quantity and arrangement to those of the recorded images, although this need not be the case in general.

A recorded image is acquired in the following manner: The illumination module 3 emits the illumination beam 4 which is swiveled in y-direction by means of the deflecting module 5 and is focused in a layer of the sample 2 on the line-shaped focus 29. Detection radiation 50 proceeding from the focus 29 is imaged confocally on the recorded image data acquisition device 7", more precisely on its line detectors 39 and 39', in direction transverse to the line by the imaging optics, i.e., the microscope optics 6 and the detection optics 7'.

The detection signals of the line detectors 39 and 39' formed in this way are fed to the image processing device 8 as recorded image data and read out from the latter.

In a predetermined time sequence, signals of the line detectors 39 and 39' are acquired via the interface 46 and stored in the storage 48 of the image processing device 8. For each detector element 45 or the respective detector element 45' of the line detector 39 or 39', the signals render the energy and, therefore, the intensity of the detection radiation that was acquired by the respective detector element 45 or 45'. A corresponding pixel of a line in the respective recorded image is associated with each detector element 45 and with the detector element 45' associated with the latter, and the acquired intensity or energy is allocated as a value to the recorded image pixel parameter of the pixel.

When the focus 29 moves from an upper position to a lower position referring to FIG. 1, a sequence of rows of pixels or, more precisely, values of pixel parameters of the recorded image pixels is acquired which yield a recorded image of the sample when arranged in relation to one another. This is illustrated in FIG. 2, where the pixels are identified by indexes i, j. Index $j=0\ldots,N-1$ designates the position of a pixel along row i which was recorded in position i of the focus 29, i.e., at a corresponding time. Position j corresponds to the position of the corresponding detector element 45 in the line detector 39. The quantity M of rows of the recorded image is given by the control of the deflecting and scanning module 5 which is determined in turn by the desired height of the image in y-direction.

The acquisition of the recorded images is carried out at constant time intervals so that a temporal sequence of recorded images $E_n$ is obtained and stored, where n is the ordinal number of the recorded image in the sequence. In the example, the frequency at which the recorded images are acquired is so high that the human eye could not differentiate between successive recorded images when displayed on the display device 9 even if it were possible to display the recorded images in real time.

Instructions of a computer program are stored in the storage 48, more precisely in a non-volatile part of the storage 48. Alternatively, the program could also be stored on a data carrier such as a CD which can be read by a CD drive, not shown, connected to the microprocessor 49. When the instructions are executed, the microprocessor 49 carries out the following process:

The image processing device 8, i.e., the microprocessor 49, acquires a temporal sequence of recorded images, i.e., more precisely, pixel parameter values of the pixels rendering the acquired recorded image, in real time and temporarily stores them in the storage 48. In the embodiment example, the recorded images are acquired at a given fixed frequency.

Immediately after the final recorded image of the partial sequence of K (K=a given natural number greater than 0) recorded images 41, i.e., the corresponding pixel parameter values, which are acquired directly one after the other, the microprocessor 49 determines a display image 42 which is associated with the partial sequence and which is immediately displayed. The next partial sequence of recorded images is acquired and the next display image is determined from this partial sequence. Therefore, a sequence of display images containing fewer images than the sequence of recorded images is formed from the sequence of recorded images over the same time period T during which the sequence of recorded images was acquired.

The display images 42 are likewise rendered by pixels 43, wherein the quantity and arrangement of the pixels of the display images 42 in the embodiment examples correspond to that of the recorded images 41, so that there is a one-to-one correspondence between pixels arranged at identical points within a recorded image and a display image (see arrows in FIG. 2). It is conceivable in other embodiment examples that the display images are lower in resolution and comprise fewer pixels than the recorded images so that a plurality of pixels of a recorded image are allocated to a pixel of a display image.

If the number pair (i, j) designates the position of a pixel in the recorded images and display images, $t_k$, k=1, K designate the acquisition times and ordinal numbers, respectively, of the recorded images in the respective partial sequence, $\tau_l$ designates the time or ordinal number of the display image associated with the partial sequence in the sequence of display images, and $e(i, j, t_k)$ and $d(i, j, \tau_l)$ designate the corresponding pixel parameters of the pixel in the respective recorded image and display image, then $d(i, j, \tau_l)$ generally designates a function F of at least the pixel parameters of the pixels of the partial sequence of recorded images which is associated with time $\tau_l$:

$$d(i,j,\tau_l) = F(e(i,j,t_1), \ldots, e(i,j,t_K)).$$

The number K can be selected in such a way, for example, that the display images are generated at a frequency, e.g., less than 30 Hz, that allows then to be perceived by the human eye when displayed on the display device 9.

The processor 49 then sends the determined display images via the graphics interface 47 to the display device 9, where they are displayed.

In this first embodiment example, the pixel parameter $d(i, j, \tau_l)$ is the gray value of the pixel of the monochromatic display image. A value which is dependent upon the maximum of the pixel parameter values of the corresponding pixel of the recorded images and which is proportional to it, for example, is associated with this pixel parameter $d(i, j, \tau_l)$ for the corresponding partial sequence of the recorded images:

$$d(i,j,\tau_l) = F_1(e(i,j,t_1), \ldots, e(i,j,t_K)) = \mathrm{MAX}(e(i,j,t_1), \ldots, e(i,j,t_K)).$$

Time $\tau_l$ preferably lies within the range of the acquisition times of the partial sequence of recorded images which immediately follow the partial sequence acquired at times $t_1$ to $t_K$ so that an online observation is possible. Since the recorded images are acquired at a given fixed frequency, the display images are also determined at a fixed frequency which is reduced by the factor 1/K relative to the acquisition frequency for the recorded image data.

A second and a third preferred embodiment form of the invention differ from the first embodiment example in that the computer program is modified in such a way that the minimum of the recorded image pixel parameter values over the partial sequence:

$$d(i,j,\tau_l) = F_2(e(i,j,t_1), \ldots, e(i,j,t_K)) = \mathrm{MIN}(e(i,j,t_1), \ldots, e(i,j,t_K))$$

or an average value over the partial sequence $$d(i, j, \tau_l) = F_3(e(i, j, t_1), \ldots , e(i, j, t_K)) = \frac{1}{K}\sum_{k=1}^{K} e(i, j, t_k)$$

is used in place of the maximum of the partial sequence as a value of the pixel parameter of the pixel of the display image.

A fourth preferred embodiment example of the invention differs from the first embodiment example in that the computer program is modified in such a way that a normalized range of variation of the values of the pixel parameter of the recorded image pixel, given in this instance by the standard deviation $$d(i, j, \tau_l) = F_3(e(i, j, t_1), \ldots , e(i, j, t_K))$$
$$= \frac{1}{K-1}\sum_{k'=1}^{K}\left(e(i, j, t_k) - \frac{1}{K}\sum_{k=1}^{K} e(i, j, t_k)\right)^2,$$

is used in place of the maximum of the partial sequence.

Accordingly, the resulting display image allows an observer to detect in a simple manner which regions of the sample layer had the greatest changes in intensity within a span of time between two successive display images or within the partial sequence of recorded images. This information about very fast processes would not be readily detectable by an observer if the recorded images were observed directly.

Alternatively, the difference between the maximum and minimum of the pixel parameter over the partial sequence can also be used as a measure of the range of variation.

A fifth embodiment form of the invention differs from the first embodiment example in that three pixel parameters containing a color coding, rather than only one pixel parameter, is associated with the pixels of the display images. For example, RGB or HSI color models can be used, where RGB parameter values can be converted into HSI parameter values. These and other usable color models and the conversion of the corresponding pixel parameters between the different models is described, for example, in Haberäcker, Peter, "Praxis der digitalen Bildverarbeitung and Mustererkennung", Munich, Hanser 1995, ISBN 3-446-15517-1, pages 46 to 57, whose contents are hereby incorporated herein by reference. For the sake of simplicity, the HSI model will be used in the following. The pixel parameters $d_H(i, j, \tau_l)$, $d_S(i, j, \tau_l)$ and $d_I(i, j, \tau_l)$ render the hue, saturation and intensity point i, j at time $\tau_l$ in a known manner. The computer program contains instructions which differ from those of the computer program of the first embodiment example in order to determine the pixel parameters of the display images by the process illustrated in the following. For the rest, the first embodiment example remains unchanged.

At least two different evaluations of the recorded images can now be carried out simultaneously and rendered in display images through the greater spatial dimension of the pixel parameters.

The saturation, i.e., the values of pixel parameter $d_S$, is set to 1 or 100% in the present embodiment example for all pixels of the display images so that color with maximum saturation is displayed.

The intensity, i.e., the values of pixel parameter $d_I$, is determined in the same way as in the first embodiment example.

The hue, i.e., the values of pixel parameter $d_H$, is determined as in the fourth embodiment example, wherein the determined ranges of variation are transformed linearly in such a way that they lie within the range of hue values that is available in the HSI color model. The fineness of the display can be varied through the selection of the proportionality constant.

In this way, the recorded images can be evaluated simultaneously with reference to two local image characteristics or pixel characteristics and can be displayed on the display device 9 for real-time observation.

In modified variants of the fifth embodiment example, the values of pixel parameter $d_I$ are determined as in the second and third embodiment examples.

Further, in another variant the allocation of the values for pixel parameters $d_I$ and $d_H$ can be exchanged so that $d_I$ renders the range of variation and $d_H$ renders the maximum of the intensity or of the gray value of the corresponding pixels of the partial sequence of recorded images.

A sixth preferred embodiment form of the invention differs from the fifth embodiment example in that at least one pixel parameter rendering the color, for example, the hue $d_H$, is used to perceptibly display actual states relative to states occurring shortly beforehand.

For this purpose, in addition to pixel parameter e, at least one other pixel parameter $e_F$ rendering a color or hue is associated with every pixel of the recorded image. Regardless of the intensity, a value rendering a color or hue is allocated to pixel parameter $e_F$ for all pixels of a recorded image depending on the acquisition time or on the position in the partial sequence. Therefore, a different color or hue is allocated to every acquisition time. Therefore, the pixels of a respective recorded image have the same color $e_F$ depending on the acquisition time, but different brightnesses e. The color can be determined, for example, for a recorded image k of the partial sequence of K recorded images by the following formula:

$$e_F(i, j, t_k) = e_{Fmin} + (e_{Fmax} - e_{Fmin})\frac{k}{K},$$

where $e_{Fmax}$ and $e_{Fmin}$ are the upper and lower limiting values of the possible value range of the hue parameter in the employed HSI color model.

In order to determine the display image, all of the recorded images of a partial sequence associated with the display image are positioned one above the other like sheets in a stack. A view through the stack yields the display image.

This can be carried out, for example, in that, in addition to the color and the brightness in the HSI model, a given saturation, for example, 1 or 100%, is associated additionally with every pixel of the recorded images of the respective partial sequence used for determining the display image.

The pixel parameters of the pixels i, j of the recorded images of the partial sequence in the HSI model are then converted into corresponding pixel parameters $e_R(i, j, t_k)$, $e_G(i, j, t_k)$, $e_B(i, j, t_k)$ of the RGB color model for red, green and blue; transformation formulas known from the above-cited book, for example, can be used for this purpose.

Corresponding pixel parameters $d_R(i, j, \tau_l)$, $d_G(i, j, \tau_l)$, $d_B(i, j, \tau_l)$ for the colors red, green and blue of the RGB model are associated with the pixels i, j of the display image. The following formulas yield the values of the pixel parameters:

$$d_R(i, j, \tau_l) = \frac{1}{K}\sum_{k=1}^{K} e_R(i, j, t_k)$$

$$d_G(i, j, \tau_l) = \frac{1}{K}\sum_{k=1}^{K} e_G(i, j, t_k)$$

$$d_B(i, j, \tau_l) = \frac{1}{K}\sum_{k=1}^{K} e_B(i, j, t_k)$$

In a following step, the maximum value $d_M$ is determined from the pixel parameters $d_R(i, j, \tau_l)$, $d_G(i, j, \tau_l)$, $d_B(i, j, \tau_l)$ of all of the pixels of the display image.

Then, in the next step, all of the pixel parameters $d_R(i, j, \tau_l)$, $d_G(i, j, \tau_l)$, $d_B(i, j, \tau_l)$ are normalized by multiplying by a factor $255/d_M$ in such a way that the maximum of the values of the pixel parameters $d_R(i, j, \tau_l)$, $d_G(i, j, \tau_l)$, $d_B(i, j, \tau_l)$ of all of the pixels i, j of the display image equals 255.

The pixel parameters of the display image can now be further processed or displayed in the RGB model. However, it is also possible to convert them to the HSI model again.

In another variant in which the display image is rendered in the HSI model, the same values as in the fifth embodiment example or the variants thereof are allocated to the pixel parameters $d_S$ and $d_I$ of the pixels of the display images, i.e., for example, for pixel (i, j), the value 100% or 1 for $d_S$ and a value rendering the maximum of $e(i, j, t_k)$ over the respective partial sequence k=1, . . . , K for $d_I$.

In contrast, the pixel parameter $d_H$ for a pixel (i, j) receives as value a weighted average of the values of pixel parameter $e_F$ of the corresponding pixels (i, j) of the recorded images of the partial sequence. The weighting is carried out as a function of the position of the respective recorded image in the partial sequence. In this example, the weighting decreases as the time interval from the last, i.e., most recent, recorded image increases. The following formula, for example, can be used for determining the pixel parameter:

$$d_H(i, j, \tau_l) = \frac{\sum_{k=1}^{K} e(i, j, t_k) e_F(i, j, t_k)}{\sum_{k=1}^{K} e(i, j, t_k)},$$

where $e_F(i, j, t_k) = e_{Fmin} + (e_{Fmax} - e_{Fmin})\frac{k}{K}$.

In this case, $e_{Fmax}$ and $e_{Fmin}$ are the upper and lower limiting value, respectively, of the possible value range of the hue parameter in the HSI color model employed.

A seventh embodiment example differs from the first embodiment example in that the value of the pixel parameter d of the display image is determined differently. The computer program is correspondingly modified to this end; otherwise the description of the first embodiment example also applies here in a corresponding manner.

As in the first embodiment example, a value is associated with the pixel parameter of every pixel of the first display image in time during an examination.

However, the values for the following display images are determined differently: The set value of the pixel is maintained constant for a given period of time Δ and then decreases at a given speed to zero. The speed is selected in such a way that a drop to zero cannot take place until after a plurality of display images. However, as soon as the value of the pixel parameter for a pixel (i, j) exceeds the actual value of the pixel parameter d(i, j) of the pixel of the display image in the actual partial sequence of recorded images, the new, current, greater value of the pixel parameter e(i, j) of the recorded image is allocated to pixel parameter d(i, j).

This value is then maintained constant again for the given period of time or reduced until a current value of the pixel parameter of the pixel of the recorded image exceeds the current value of the pixel parameter of the pixel in the display image.

This leads to an after-illumination of pixels of high intensity so that an observer can detect high intensities on the screen in a simple manner even when they only occur very briefly.

In other embodiment examples, homogeneous neutral splitters (e.g., 50/50, 70/30, 80/20, or the like) or a dichroic splitter can also be used as color splitters. In order to allow a selection based upon the application, the main color splitter is preferably provided with a mechanism which makes it possible to effect a change in a simple manner, for example, by means of a corresponding splitter wheel containing the individual exchangeable splitters.

In another embodiment form, a laser scanning microscope which scans point-by-point is used for acquiring the recorded images such as is described, e.g., in DE 197 02 753 A1, whose contents, at least in this regard, are hereby incorporated herein by reference.

In yet another embodiment example, for generating the display images, the display image is determined from a partial sequence with those recorded images of the recorded image sequence that were acquired within a given time period, preferably 1 s, prior to the determination of the display image.

While the foregoing description and drawings represent the present invention, it will be obvious to those skilled in the art that various changes may be made therein without departing from the true spirit and scope of the present invention.

The invention claimed is:

1. A process for generating display images on an electronic display, the process comprising:
    acquiring a temporal sequence of electronically recorded images and generating a temporal sequence of display images from the sequence of recorded images; and
    generating, on an electronic display, a display image of the sequence of display images in each instance from a partial sequence of at least two already acquired recorded images of the recorded image sequence, said partial sequence being associated with said display image;
    wherein the recorded images and display images are formed by an arrangement of pixels;
    wherein, for determining at least one display image, the value of at least one pixel parameter of at least one pixel of the display image is determined from values of a pixel parameter of at least one recorded image pixel in the partial sequence of already acquired recorded images that is associated with the display image, where the recorded image pixel is associated with the pixel of the respective display image; and
    wherein a maximum of the brightnesses of the pixels of the associated partial sequence of preceding recorded images, the pixels being associated with at least one pixel of the display image as pixel parameter, is associated with the at least one pixel of the display image, then the brightness value is retained for a predetermined period of time and is then reduced by a predetermined dropping speed, wherein the brightness value of the pixel of the display image is reset when a brightness value of the associated pixel in a current recorded image is greater than the current brightness value of the pixel in the display image.

2. The process according to claim 1;
    wherein the quantity of display images of the sequence of display images is less than the quantity of recorded images of the recorded image sequence.

3. The process according to claim 1;
    wherein, for the purpose of generating the display images, at least one display image is determined from a partial sequence with those recorded images of the recorded image sequence which:
        were acquired either (1) during or after the determination of the display image immediately preceding the display image, or (2) within a given time period prior to the determination of the display image; or
        were acquired both (1) during or after the determination of the display image immediately preceding the display image, and (2) within a given time period prior to the determination of the display image.

4. The process according to claim 3;
    wherein the at least one display image is determined from a partial sequence with those recorded images of the recorded image sequence which were acquired within a given time period prior to the determination of the display image; and
    wherein the given time period is 1 second.

5. The process according to claim 1;
    wherein the recorded image pixel parameter reproduces an intensity, a gray scale value or a brightness of the recorded image pixel, and wherein two pixel parameters of a pixel of the display image reproduce a color and brightness of the pixel depending upon values of the recorded image pixel parameter of the associated pixel of the associated partial sequence of recorded images.

6. The process according to claim 1;
wherein the recorded image pixel parameter reproduces an intensity, a gray scale value or a brightness of the recorded image pixel, and wherein the value of the at least one pixel parameter of a pixel of the respective display image renders the maximum, the minimum or an average of the recorded image pixel parameter of the associated pixel of the associated partial sequence of the recorded images.

7. The process according to claim 1;
wherein the recorded image pixel parameter reproduces an intensity, a gray scale value or a brightness of the recorded image pixel, the value of the at least one pixel parameter of the pixel of the respective display image renders the range of variation of the values of the recorded image pixel parameter of the pixel of the associated partial sequence of previously acquired recorded images, which pixel is associated with the display image pixel.

8. The process according to claim 1;
wherein the value of at least one pixel parameter of at least one pixel of the display image is determined depending on the progress of the values of at least one pixel parameter of at least one pixel of the recorded images of the partial sequence which is associated with the display image.

9. The process according to claim 1;
wherein a color is associated with at least one pixel of the recorded images of a partial sequence as a pixel parameter, which color corresponds to the position of the recorded image in the partial sequence or to the acquisition time, and wherein a value of a pixel parameter of a display image pixel associated with the recorded image pixel, which pixel parameter reproduces a color, is determined depending on the values of the pixel parameter.

10. A computer program for a data processing device stored on a computer-readable medium, the computer program comprising:
an acquisition interface for acquiring recorded image data or recorded image signals;
a graphics interface for a display device;
a storage in which data and the computer program are stored; and
at least one processor which is connected to the interfaces and to the storage;
wherein the computer program comprises instructions; and
wherein, when the instructions are carried out, the processor implements a process according to claim 1 and sends the generated display images to the display device via the graphics interface.

11. An image processing device which comprises:
an acquisition interface for acquiring recorded image data or recorded image signals; and
a graphics interface for a display device and which is constructed in such a way that a temporal sequence of recorded images can be acquired via the acquisition interface and an image data acquisition device connected to the latter and a temporal sequence of display images can be generated from the recorded image sequence;
wherein a display image of the display image sequence is generated from a partial sequence of at least two already acquired recorded images of the recorded image sequence, said partial sequence being associated with the display image of the display image sequence;
wherein the display images can be sent to the display device via the graphics interface;
wherein the recorded images and display images are formed by an arrangement of pixels;
wherein the image processing device is configured in such a way that, for determining at least one display image, the value of at least one pixel parameter of at least one pixel of the display image is determined from values of a pixel parameter of at least one recorded image pixel in the partial sequence of already acquired recorded images that is associated with the display image, where the recorded image pixel is associated with the pixel of the respective display image;
wherein the image processing device is further constructed in such a way that a maximum of the brightnesses of the pixels of the associated partial sequence of preceding recorded images, the pixels being associated with at least one pixel of the display image as pixel parameter, is associated with the at least one pixel of the display image, then the brightness value is retained for a predetermined period of time and is then reduced by a predetermined dropping speed; and
wherein the brightness value of the pixel of the display image is reset when a brightness value of the associated pixel in a current recorded image is greater than the current brightness value of the pixel in the display image.

12. The image processing device according to claim 11;
which is further constructed in such a way that the quantity of display images of the sequence of display images is less than the quantity of recorded images of the recorded image sequence prior to the determination of the display image.

13. The image processing device according to claim 11;
which is further constructed in such a way that, for the purpose of generating the display images, at least one display image is determined from a partial sequence with those recorded images of the recorded image sequence which:
were acquired either (1) during or after the determination of the display image immediately preceding the display image, or (2) within a given time period prior to the determination of the display image; or
were acquired both (1) during or after the determination of the display image immediately preceding the display image, and (2) within a given time period prior to the determination of the display image.

14. The image processing device according to claim 13;
wherein the at least one display image is determined from a partial sequence with those recorded images of the recorded image sequence which were acquired within a given time period prior to the determination of the display image; and
wherein the given time period is 1 second.

15. The image processing device according to claim 11;
which is further constructed in such a way that the recorded image pixel parameter reproduces an intensity, a gray scale value or a brightness of the recorded image pixel, and two pixel parameters of a pixel of the display image reproduce a color and brightness of the pixel depending upon values of the recorded image pixel parameter of the associated pixel of the associated partial sequence of recorded images.

16. The image processing device according to claim 11; which is further constructed in such a way that the recorded image pixel parameter reproduces an intensity, a gray scale value or a brightness of the recorded image pixel, and that the value of the at least one pixel parameter of a pixel of the respective display image renders the maximum, the minimum or an average of the recorded image pixel parameter of the associated pixel of the associated partial sequence of the recorded images.

17. The image processing device according to claim 11; which is further constructed in such a way that the recorded image pixel parameter reproduces an intensity, a gray scale value or a brightness of the recorded image pixel, and the at least one pixel parameter of the pixel of the respective display image renders the range of variation of the values of the recorded image pixel parameter of the pixel of the associated partial sequence of previously acquired recorded images, which pixel is associated with the display image pixel.

18. The image processing device according to claim 11; which is further constructed in such a way that the value of at least one pixel parameter of at least one pixel of the display image is determined depending on the progress of the values of at least one pixel parameter of at least one pixel of the recorded images of the partial sequence which is associated with the display image.

19. The image processing device according to claim 11; which is further constructed in such a way that a color is associated with at least one pixel of the recorded images of a partial sequence as a pixel parameter, which color corresponds to the position of the recorded image in the partial sequence or to the acquisition time, and a value of a pixel parameter of a display image pixel associated with the recorded image pixel, which pixel parameter reproduces a color, is determined depending on the values of the pixel parameter.

20. An imaging device comprising:
an image data acquisition device;
imaging optics for imaging an object on the image data acquisition device; and
an image processing device according to claim 11;
wherein the acquisition interface is connected to the image data acquisition device.

21. The imaging device according to claim 20 which is constructed as a microscope.

22. The imaging device according to claim 21;
wherein the image data acquisition device simultaneously acquires an at least line-shaped region or a group of points of a sample.

\* \* \* \* \*